(12) United States Patent
Kobayashi

(10) Patent No.: US 6,307,823 B1
(45) Date of Patent: Oct. 23, 2001

(54) OPTICAL INFORMATION MEDIUM, OPTICAL INFORMATION RECORDING METHOD AND OPTICAL INFORMATION RECORDING APPARATUS

(75) Inventor: Seiji Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/322,847

(22) Filed: May 28, 1999

(30) Foreign Application Priority Data

Jun. 1, 1998 (JP) .................................................. 10-151675

(51) Int. Cl.[7] ...................................................... G11B 5/09
(52) U.S. Cl. ..................... 369/47.19; 369/47.28; 369/59.12; 369/124.04; 369/124.14; 369/275.3
(58) Field of Search .............................. 369/47.15, 47.17, 369/47.19, 47.28, 47.35, 47.38, 47.4, 47.41, 47.46, 47.51, 53.34, 59.12, 124.04, 275.3, 124.14

(56) References Cited

U.S. PATENT DOCUMENTS 5,517,481 * 5/1996 Kobayashi .......................... 369/47.17
5,703,853 * 12/1997 Horigome et al. ............. 369/275.3 X
5,809,004 * 9/1998 Kobayashi et al. ........... 369/275.3 X

* cited by examiner

*Primary Examiner*—Paul W. Huber
(74) *Attorney, Agent, or Firm*—Oblon, Spivak, McClelland, Maier & Neustadt, P.C.

(57) ABSTRACT

Provided are an optical information medium, an optical information recording method and an optical information recording apparatus in which an accurate cross talk can be predicted with a simple structure in a recording mode such as CLV so that a disk having a cross talk reduced can be created. The optical information recording apparatus is caused to generate a modulating signal based on data and to then predict a bit string on a disk to be generated during recording of the modulating signal on an optical disk and to predict the position of the bit string in relation to a rotation angle in the optical disk, and further comprises a cross talk compensation value computing circuit (7) for computing information on adjacent tracks in response to information on the rotation angle thus obtained and the modulating signal, a timing correcting circuit 8 for obtaining a correction value based on an output of the cross talk compensation value computing circuit (7), and an optical modulator 10 for correcting the modulating signal based on the corrected value.

13 Claims, 11 Drawing Sheets

Track #1

| n | SC(n) | φ(n) |
|---|---|---|
| 1 | 1 | 0.000011 |
| 2 | 1 | 0.000023 |
| 3 | 1 | 0.000034 |
| 4 | 0 | 0.000045 |
| 5 | 0 | 0.000056 |
| 6 | 0 | 0.000068 |
| 7 | 1 | 0.000079 |
| 8 | 1 | 0.000090 |
| 9 | 1 | 0.000101 |
| 10 | 1 | 0.000112 |
| 11 | 1 | 0.000124 |
| 12 | 0 | 0.000135 |
| 13 | 0 | 0.000146 |
| 14 | 0 | 0.000158 |
| 15 | 1 | 0.000169 |
| 16 | 1 | 0.000180 |
| 17 | 1 | 0.000191 |
| 18 | 0 | 0.000203 |
| 19 | 0 | 0.000214 |
| 20 | 0 | 0.000225 |
| 21 | 0 | 0.000236 |
| 22 | 1 | 0.000248 |
| 23 | 1 | 0.000259 |
| 24 | 1 | 0.000270 |
| ... | ... | ... |

Track #2

| n | SC(n) | φ(n) |
|---|---|---|
| 558505 | 0 | 6.283183 |
| 558506 | 0 | 6.283194 |
| 558507 | 1 | 6.283206 |
| 558508 | 1 | 6.283217 |
| 558509 | 1 | 6.283229 |
| 558510 | 1 | 6.283240 |
| 558511 | 0 | 6.283252 |
| 558512 | 0 | 6.283263 |
| 558513 | 0 | 6.283275 |
| 558514 | 0 | 6.283286 |
| 558515 | 1 | 6.283298 |
| 558516 | 1 | 6.283309 |
| 558517 | 1 | 6.283321 |
| 558518 | 0 | 6.283332 |
| 558519 | 0 | 6.283344 |
| 558520 | 0 | 6.283355 |
| 558521 | 1 | 6.283367 |
| 558522 | 1 | 6.283378 |
| 558523 | 1 | 6.283390 |
| 558524 | 0 | 6.283401 |
| 558526 | 0 | 6.283413 |
| 558527 | 0 | 6.283424 |
| 558528 | 0 | 6.283436 |
| 558529 | 0 | 6.283447 |
| ... | ... | ... |

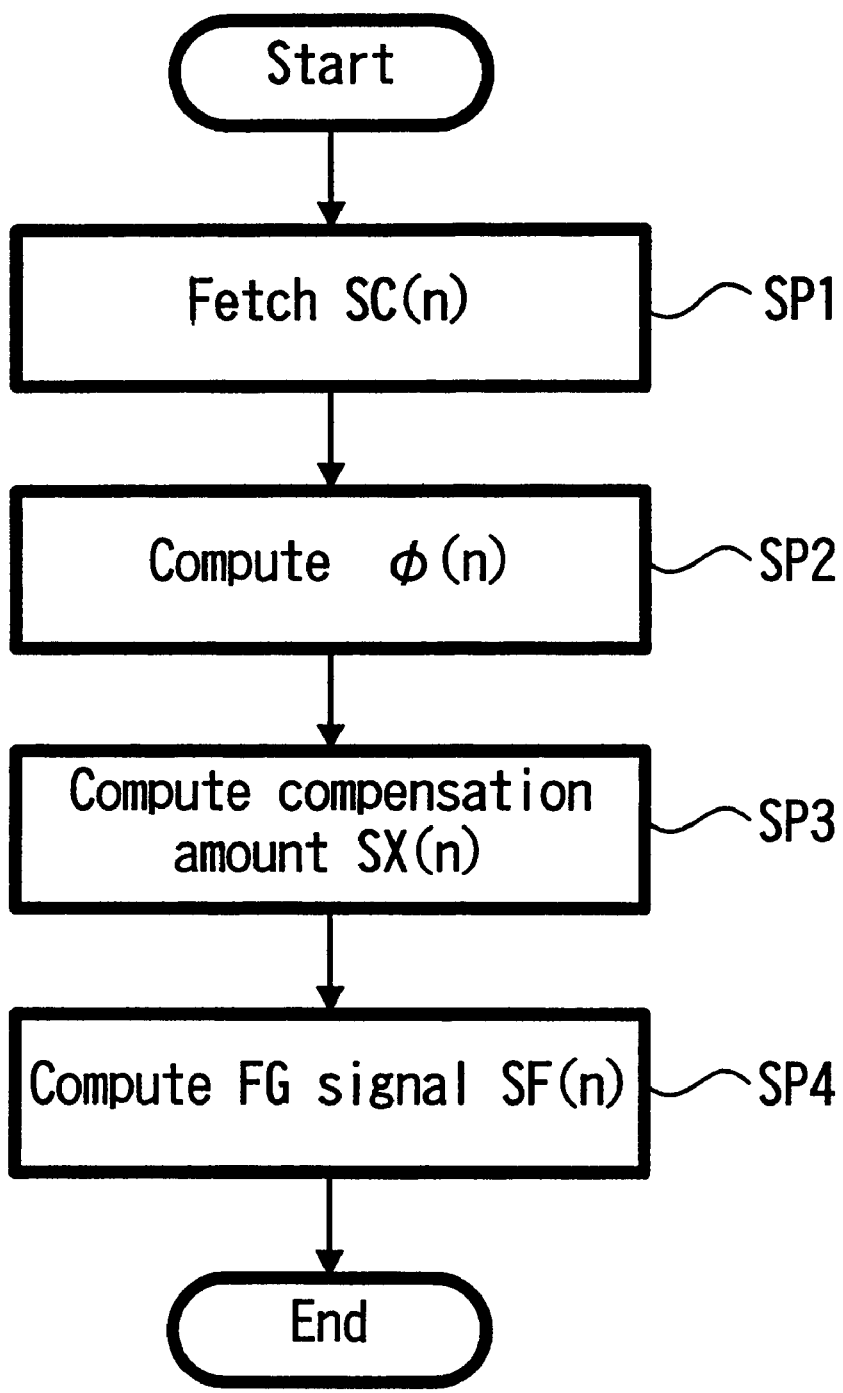

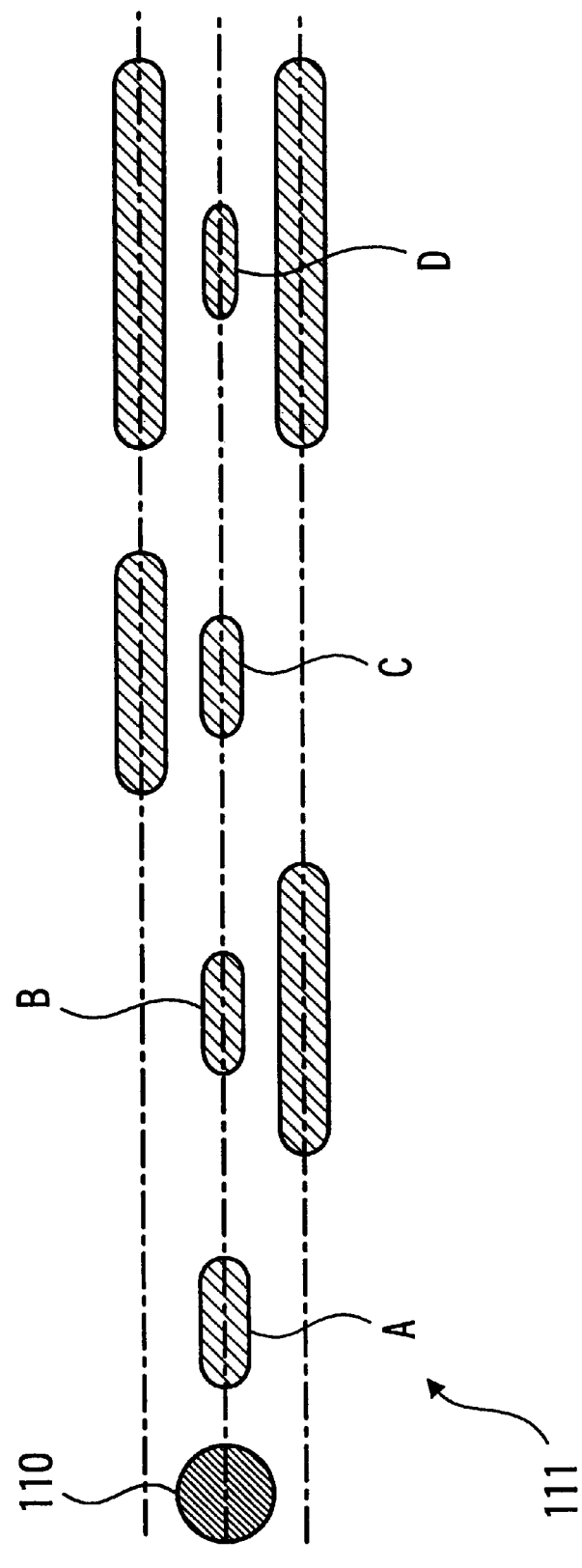

OPTICAL INFORMATION MEDIUM, OPTICAL INFORMATION RECORDING METHOD AND OPTICAL INFORMATION RECORDING APPARATUS

FIELD OF THE INVENTION

1. Background of the Invention

The present invention relates to an optical information medium, an optical information recording apparatus and an optical information recording method, and can be applied to a compact disk (CD) and a digital video disk (DVD) and recording apparatus for these disks, for example. The present invention serves to control a timing of laser light radiation or an output of the laser light during recording depending on information recorded on a track adjacent to bits which are being recorded, thereby creating a disk of high quality which reproduces a good signal having a cross talk reduced.

2. Description of the Related Art

In a conventional compact disk recording apparatus comprising this kind of optical information medium, for example, data to be recorded is processed and then subjected to an EFM (Eight-to-Fourteen Modulation) to form a bit string having a period of 3T to 11T for a predetermined fundamental period T, thereby recording audio data and the like.

Correspondingly, a compact disk player serves to radiate a laser light on a compact disk and to receive a return light to obtain a reproduced signal whose level is changed depending on the amount of the return light, and to change the reproduced signal into a binary signal depending on a predetermined slice level. Furthermore, the compact disk player serves to drive a PLL circuit in response to the binary signal to generate a reproduced clock, and to sequentially latch the binary signal in response to the reproduced clock, thereby generating reproduced data having a period of 3T to 11T corresponding to a bit string formed on the compact disk.

The compact disk player decodes the reproduced data thus generated by a data processing corresponding to a data processing to be performed during recording, and reproduces audio data and the like which are recorded on the compact disk.

Referring to recording and regeneration of the conventional compact disk (CD disk), Japanese Unexamined Patent Publication No. Sho 58-2628 has disclosed a disk recording apparatus in which the output power of a laser light is changed and the pulse width of a pulse signal is reduced so that a bit capable of obtaining a reproduced signal having no difference from a recording signal is formed on a disk. Furthermore, Japanese Unexamined Patent Publication No. Hei 3-83230 has disclosed an optical recording apparatus in which a write pulse having a pulse width smaller by a pulse width equivalent to the extension of a bit caused by the thermal time constant of an optical recording medium is formed from a base band signal and a recording light whose pulse width is modulated by the write pulse is radiated on an optical information medium so that a bit having a normal length is formed on the optical information medium having a great thermal time constant in response to the base band signal. Moreover, Japanese Unexamined Patent Publication No. Sho 62-54830 has disclosed an optical disk recording and reproducing apparatus in which recording is performed while sequentially changing the pulse width of a laser light, the pulse width of the laser light is selected when the pulse width of a reproduced signal has a predetermined value so that optimal recording conditions can be set under a disk to be used and environmental conditions even if a recording sensitivity is varied at every disk and the magnitude of the laser light is changed depending on a temperature, and the reliability of the reproduced signal can be enhanced and the density of information recording can be increased.

In recent years, such a compact disk has generally been reproduced at a high transfer rate. In a reproducing apparatus having a high transfer rate, for example, a compact disk is rotated at a speed which is eight times as high as a predetermined rotational speed or more, thereby reproducing data at a high speed. In such a reproducing apparatus having a high transfer rate, the same amount of data can be obtained in a much shorter time than a usual time.

As an apparatus for realizing suitable reproduction at such a high transfer rate, Japanese Unexamined Patent Publication No. Hei 09-275972 has disclosed the invention which has been made by the same inventor and filed by the same applicant as in the present invention. The above-mentioned invention has provided an optical disk medium, an optical disk recording method and an optical information recording apparatus in which a cross talk sent from an adjacent track is reduced so that less jitter is generated from the cross talk and a stable signal can be reproduced at a high noise level.

In order to perform reproduction at a high transfer rate, the number of rotations of the disk should be increased and also an electronic circuit having a wide band is required. The electronic circuit having a wide band generally has a high noise level. Therefore, the jitter of the disk should be reduced in order to reproduce a stable signal at a high noise level.

The invention made by the same inventor and filed by the same applicant as in the present invention, that is, the Japanese Unexamined Patent Publication No. Hei 09-275972 takes the above respect into consideration, and has proposed an optical information medium, an optical information recording apparatus and an optical information recording method in which a pattern recorded on an adjacent track is predicted in advance and a recording signal is corrected based on the prediction so that less jitter is generated due to a cross talk and a signal can be stably decoded at a high transfer rate.

The invention made by the same inventor and filed by the Japanese Unexamined Patent Publication No. Hei 09-275972 has attained the above-mentioned object very effectively in an optical disk in which recording is performed on the condition of the constant number of rotations that is referred to as a CAV (Constant Angular Velocity). Furthermore, the present invention is very effectively also in an optical disk having the number of rotations changed stepwise, which will hereinafter referred to as a ZCAV (Zoned Constant Angular Velocity).

Furthermore, the above-mentioned patent is also effective in an optical disk in which recording is performed on the condition that the number of rotations is changed with a time that will be hereinafter referred to as a CLV (Constant Linear Velocity). However, in the case where the patent is applied to the optical disk having the CLV, there is a possibility that a prediction value of a cross talk sent from information recorded on an adjacent track might have errors. Depending on the application, there has been a problem in that less effect is obtained by removing the cross talk. If the errors are to be fully reduced, the scale of a circuit might be increased depending on an implementing method.

SUMMARY OF THE INVENTION

In order to solve the above-mentioned problems, the present invention provides an optical information recording apparatus which serves to generate a modulating signal based on data and then to predict a bit string on a disk which is to be data and then to predict a bit string on a disk which is to be generated when the modulating signal is recorded on an optical disk. At this time, in the optical information recording apparatus according to the present invention, the position of the bit string is predicted in relation to a rotation angle in the optical disk. Furthermore, the optical information recording apparatus comprises a adjacent track information computing means for computing the information of the adjacent track in response to the information on the rotation angle thus obtained and the modulating signal, a correction value computing means for obtaining a correction value based on the output of the adjacent track information computing means, and a signal correcting means for correcting the modulating signal based on the correction value. Moreover, the optical information recording apparatus comprises a rotation control means for controlling the rotating means according to the angle information. Therefore, also in a recording mode in which the rotational speed is variable such as the CLV, an accurate cross talk can be predicted with a simple structure. As a result, it is possible to create a disk having a cross talk reduced more than in a conventional method.

Consequently, the disk created by the optical information recording apparatus according to the present invention can reduce an overall jitter even in the CLV mode and can perform stable reproduction even if a noise level is more or Furthermore, the present invention provides an optical information recording method comprising a modulating signal creating step for creating a modulating signal in accordance with the digital data, an angle information computing step for computing angle information of a laser light on the medium when the laser light modulated by the modulating signal is radiated on the medium, a correction information computing step for obtaining correction information for correcting the modulating signal in response to the modulating signal and the angle information, a rotation control step for controlling a rotation of the rotating device in accordance with the angle information, and a signal correcting step for correcting the modulating signal in accordance with the correction information to obtain a correction modulating signal.

In the optical information recording method according to the present invention, therefore, it is possible to precisely estimate a cross talk predicted from the information recorded on an adjacent track. By finely adjusting the modulating signal according to the cross talk thus estimated, it is possible to almost completely remove a jitter generated by the cross talk sent from the adjacent track during reproduction. Consequently, a disk having a low jitter can be created. As a result, the disk created by the optical information recording method of the present invention can greatly reduce an overall jitter even in the CLV mode, and can perform stable reproduction even if a nose level is more or less raised at a high transfer rate.

Moreover, the present invention provides an optical information medium in which the positions of edges before and after the bit are adjusted according to bit patterns recorded on a plurality of tracks adjacent to the bit on the disk recorded in the CLV mode. Therefore, in the case where such a medium is reproduced by an ordinary optical disk device, an overall jitter is reduced and stable reproduction can be performed even if a noise level is more or less raised at a high transfer rate. The function of adjusting the positions of the edges before and after the bit can be implemented by an element referred to as a programmable delay line and put on the market or the like in the recording apparatus. Consequently, an inexpensive recording medium can be implemented.

Furthermore, the present invention provides an optical information medium in which a bit width is adjusted depending on patterns recorded on the tracks adjacent to the bit on the disk recorded in the CLV mode. Therefore, in the case where such a medium is reproduced by an ordinary optical disk device, an overall jitter is reduced and stable reproduction can be performed even if a noise level is more or less raised at a high transfer rate. The function of adjusting the bit width can easily be implemented in the recording apparatus. Consequently, an inexpensive recording medium can be implemented.

BRIEF DESCRIPTION OF THE DRAWINGS

FIG. 6 is a flowchart showing the processing procedure of a computer according to the present invention;

FIG. 11 is a diagram typically representing a bit on an optical information medium according to the present invention.

DETAILED DESCRIPTION OF THE PREFERRED EMBODIMENTS

An embodiment of the present invention will be described in detail with reference to the accompanying drawings.

Figure 1:
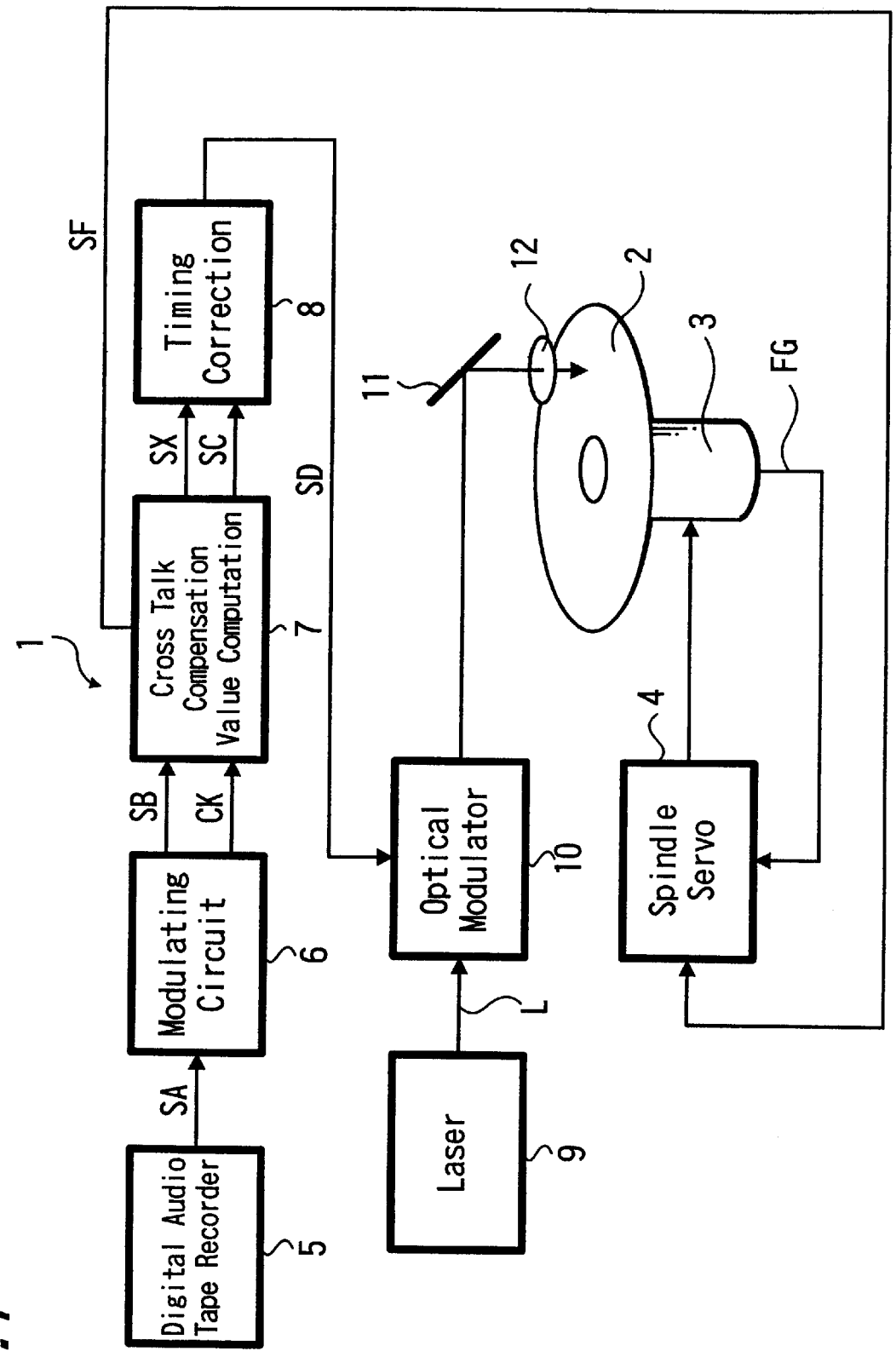
FIG. 1 is a block diagram showing the structure of an optical disk recording apparatus according to the present invention.

FIG. 1 is a block diagram showing an optical disk recording apparatus 1 according to the embodiment of the present invention. The optical disk recording apparatus 1 serves to expose an optical disk 2 which is a disk original to light and to record audio data SA output from a digital audio tape recorder 5. In the optical disk manufacturing process, the disk original 2 is developed and electroforming is then performed thereon to create a mother disk, and a stamper is created by the mother disk. In the optical disk manufacturing process, a disk-shaped board is created by the stamper thus created, and a reflective film and a protective film are formed on the disk-shaped board to create a compact disk.

In the optical disk recording apparatus 1, a spindle motor 3 rotates the disk original 2, and outputs an FG signal FG from an FG signal generating circuit held on a bottom thereof. The FG signal FG has a signal level which rises at every predetermined rotation angle. A spindle servo circuit 4 drives the spindle motor 3 corresponding to the position of exposure of the disk original 2 in such a manner that the frequency of the FG becomes FG has a predetermined frequency. Consequently, the disk original 2 is rotated to have the predetermined number of rotations. More specifically, the spindle servo circuit 4 controls the spindle motor 3 in such a manner that the phases and frequencies of the FG signal and a signal SF output from a cross talk compensation value computing circuit 7 are coincident with each other. In the following embodiment, description will be given to the spindle motor 3 which rotates to satisfy the condition of an almost constant linear velocity (hereinafter referred to as a CLV mode).

A recording laser 9 comprises a gas laser or the like and emits a laser light L for exposing the disk original to light. An optical modulator 10 comprises an electroacoustic optical element and on-off controls and outputs the laser light L in response to a modulating signal SD. A mirror 11 bends the optical path of the laser light L and emits the laser light L having the bent optical path toward the disk original 2. An objective lens 12 collects the light reflected by the mirror 11 onto the disk original 2. The mirror 11 and the objective lens 12 are sequentially moved in the outer peripheral direction of the disk original 2 synchronously with the rotation of the disk original 2 by means of a sled mechanism which is not shown. Consequently, the position of the exposure of the laser light L is sequentially shifted in the outer peripheral direction of the disk original 2.

In the optical disk recording apparatus 1, consequently, a track is spirally formed by the movement of the mirror 11 and the objective lens 12 and bits are sequentially formed on the track in response to a modulating signal SD with the optical disk of the disk original 2 being rotated.

A modulating circuit 6 receives the audio data SA output from the digital audio tape recorder 5 and adds corresponding subcode data to the audio data SA. Furthermore, the modulating circuit 6 process the audio data SA and the subcode data according to the format of the compact disk, and generates a modulating signal SB. More specifically, the modulating circuit 6 adds an error correction code to the audio data SA and the subcode data, and then performs interleaving and EFM modulation therefor. Consequently, the modulating circuit 6 outputs an EFM modulating signal SB whose level is changed in a cycle (3T to 11T) that is integer times as great as a fundamental cycle T for bit formation. Furthermore, the modulating circuit 6 generates a channel clock signal CK which is changed for each fundamental cycle T, and sends the channel clock signal CK to the cross talk compensation value computing circuit 7.

In an optical disk recording apparatus which has conventionally been used, the EFM modulating signal SB thus generated has been sent to the optical modulator 10 as it is, and the laser light L obtained from the laser 7 has been turned on/off to perform exposure on the optical disk original 2.

In the disk fabricated by such a conventional method, the state of a reproduced signal is changed due to a cross talk sent from bits recorded on adjacent tracks so that a jitter is caused.

In the present invention, the output signal SB and the channel clock signal CK of the modulating circuit 6 are sent to the cross talk compensation value computing circuit 7. In the cross talk compensation value computing circuit 7, a recording modulating signal SC and a cross talk compensation value SX are computed and output the same to a timing correcting circuit 8. Furthermore, the cross talk compensation value computing circuit 7 generates a rotation reference signal SF of the spindle motor 3 and sends the same signal SF to the spindle servo circuit 4.

In an optical information recording apparatus according to the present invention, the circuit which has thus computed the compensation value of the cross talk serves to control the spindle motor 3. Accordingly, even if the number of rotations is varied as in the CLV mode, precise correction can always be performed with a simple structure.

In the timing correcting circuit 8, an edge shift according to the cross talk compensation value SX obtained in the above-mentioned manner is given to the recording modulating signal SC. Thus, a corrected modulating signal SD is sent to the optical modulator 10 to turn on/off and record the output of the laser 7. Consequently, it is possible to solve the problem that the jitter is increased by the cross talk sent from the adjacent tracks over the whole surface of the disk fabricated in the CLV mode. As a result, a disk having a good jitter can be created.

Figure 2:
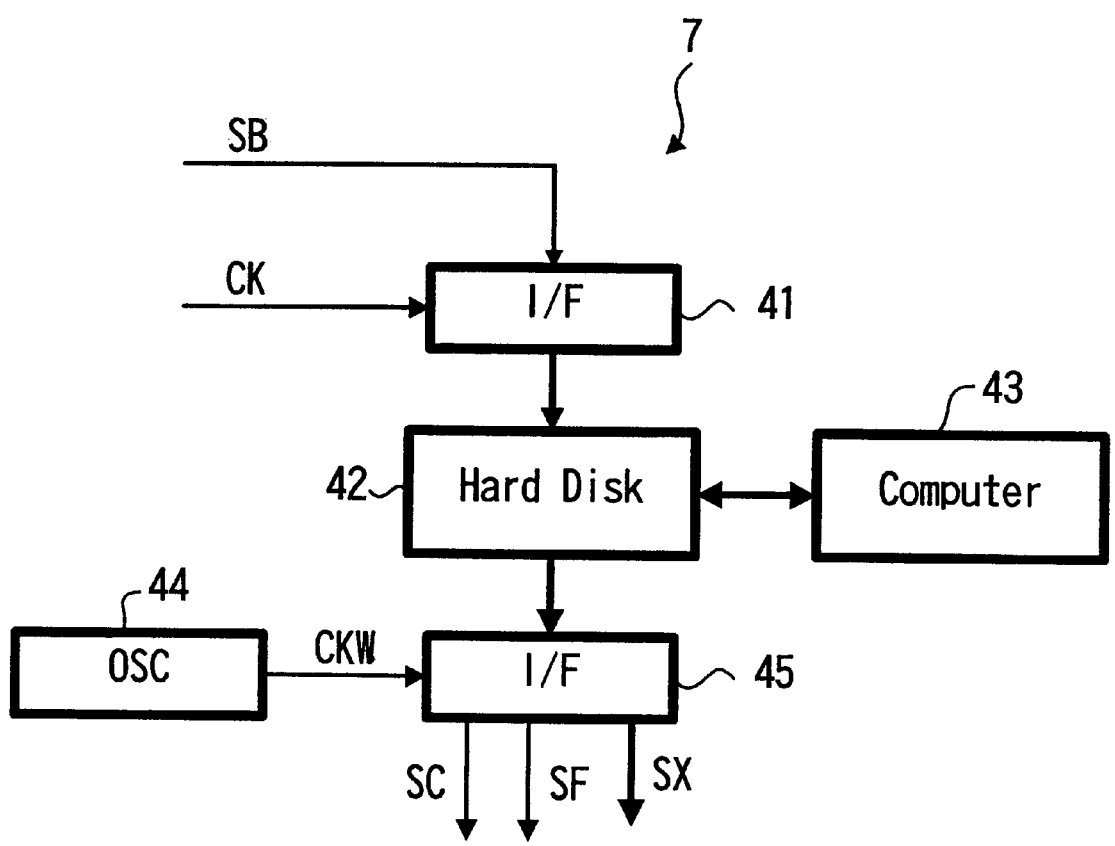
FIG. 2 is a block diagram showing the structure of a cross talk compensation value computing circuit according to the present invention.

FIG. 2 is a block diagram showing an example of the structure of the cross talk compensation value computing circuit 7. In FIG. 2, the modulating signal SB input to the crows talk compensation value computing circuit 7 is sampled at every channel clock CK by means of an input interface circuit (I/F) 41 and is then stored in a hard disk 42. A computer 43 reads the modulating signal SB recorded in the hard disk 42 and performs the following processing to generate the recording modulating signal SC, an optical output control signal SF and a cross talk compensation value SX and to then store them in the hard disk 42.

The data which have completely been stored in the hard disk 42 are sequentially read from the hard disk 42 by a recording channel clock CKW oscillated at a predetermined frequency by an oscillating circuit (OSC) 44, and are output through an output interface circuit (I/F) 45.

Figure 3:
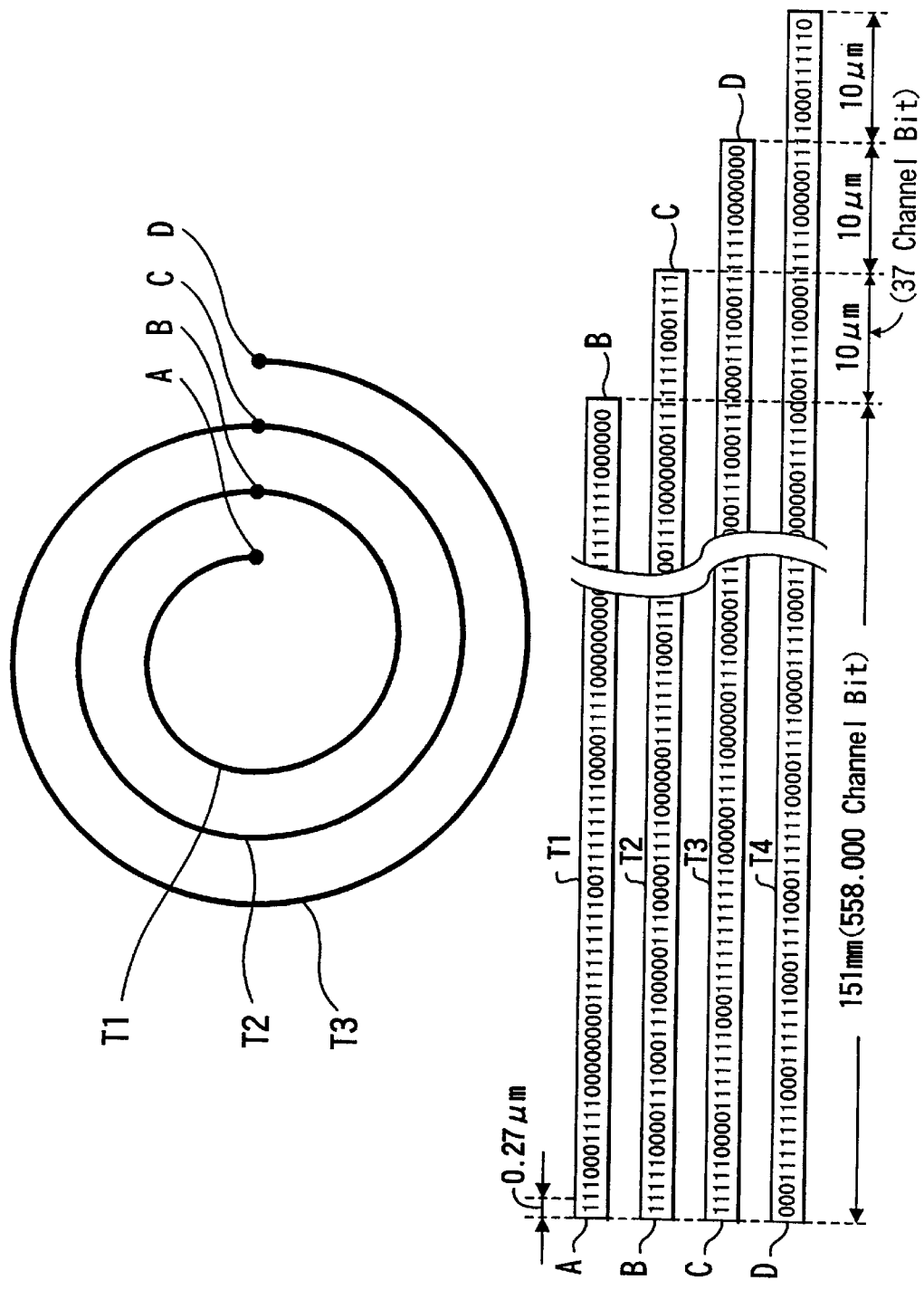
FIG. 3 is a diagram typically representing adjacent tracks and the state of a recording signal according to the present invention.

FIG. 3 is a diagram typically showing the positional relationship of recording information between tracks in the CLV mode. In the CLV mode, the number of rotations is changed according to a recording radius. As a result, a recording density is set constant. Consequently, in the case where recording is performed from a radius of 24 mm, for example, information having a track number 1 recorded on the radius of 24 mm is recorded from a point A to a point B shown in FIG. 3.

In FIG. 3, the track number 1 from the point A to the point B is recorded on the radius of 24 mm. Therefore, the track has an overall length of about 151 mm. In FIG. 3, information (EFM signal) having 1 or 0 for each clock of 0.27 micron is recorded on the track having the length of about 151 mm. Accordingly, information of 151 (mm)÷0.27 (micron)=about 558000 clocks is recorded in the track number 1. If a track pitch is 1.6 microns, the overall length of a track number 2 is longer by about 10 microns than the track number 1. Accordingly, information is added to the track number 2 more greatly than the track number 1 by about 37 channel clocks. Similarly, an information content of 37 channel clocks which is to be recorded on a track number 3 is increased as compared with the track number 2.

The lower part of FIG. 3 shows the state of the information content thus increased according to the track number. The length of a channel clock to be recorded on each track is constant. Therefore, if one channel clock is set to a predetermined length and a spiral track is represented by a straight line, the information on each track can be illustrated in the diagram in which the length is increased at every track number.

Referring to the arrangement of the information between the tracks shown in the lower part of FIG. 3, the information recorded on each track is aligned vertically. Therefore, it is possessed with the illusion that the relative positions of the information recorded in the tracks are clear. For example, however, it is observed that an end point B of the track number 1 (a topmost numeric string) and an end point C of the track number 2 are shifted from each other by about 10 microns in the lower part of FIG. 3. In the upper part of FIG. 3, however, it is apparent that these two places are adjacent to each other on the disk. More specifically, in the case where the signal is arranged as in the lower part of FIG. 3, there is a possibility that the positions of the signals in the respective tracks might be slightly shifted. For this reason, if the information recorded in the tracks is obtained by the expression shown in the lower part of FIG. 3, there is a possibility that an obtained value might have errors.

Figure 4:
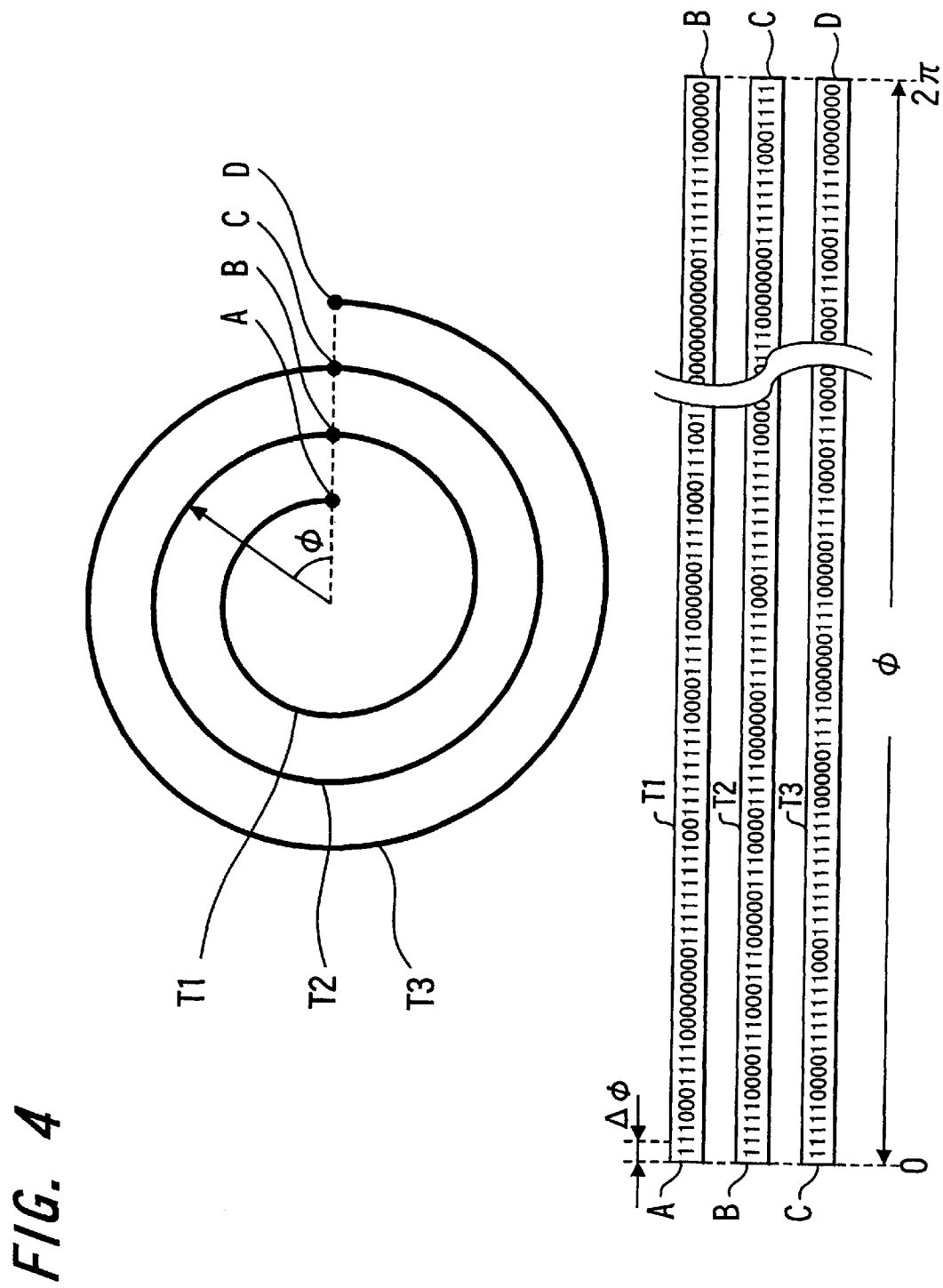
FIG. 4 is a diagram representing the adjacent tracks and the state of the recording signal with a rotation angle as a unit according to the present invention.

In the cross talk compensation value computing circuit 7 to be used for the optical information recording apparatus according to the present invention, angle information is obtained at every channel clock with the recorded information arranged on the disk so that the above-mentioned problems can be solved. This state is typically shown in FIG. 4. In FIG. 4, for the information recorded on each track, a rotation angle Ø on the disk is obtained for each channel clock. As shown in the lower part of FIG. 4, the information recorded on each track is arranged as a function of Ø. Thus, the relative positions of the bit strings on the disk are accurately reflected by the arranged data strings. Therefore, cross talk information between the tracks can precisely be obtained. Also in the CLV mode, it is possible to create a disk of high signal quality with a cross talk more reduced.

In FIG. 4, only the whole concept is illustrated. FIG. 5 shows an implementation example in which the recording modulating signal SC is arranged for each angle information Ø with respect to a part of the track numbers 1 and 2. On the left side (A) of FIG. 5 is shown an example in which "111000111110001110000111" is recorded as a data string (SC) on the track number 1. The channel clock is indicated as "n" on a leftmost column. The recording modulating signal SC (n) for each channel clock is indicated in a second column. A rotation angle Ø (n) for each channel clock CK which is obtained by the following method is indicated in a rightmost column. FIG. 5 (B) shows a state in which a pattern of track number 2 "001111000011100011100000" is recorded in the same order.

If each data is thus arranged by using the angle information as a reference, there is an advantage that the relative relationship of the tracks can be understood easily and precisely. For example, "111" is described as a recording modulating signal SC (n) from the 558515th channel clock to the 55817th channel clock of the track number 2. Therefore, it is apparent that a bit having a length of 3 channel clocks is recorded therein. It is also apparent that an angle in which the 3T bit is recorded ranges from 6.283298 radians to 6.283321 radians.

Figures 5A, 5B:
FIGS. 5A and 5B are correspondence tables for the recording signal and the rotation angle according to the present invention, in which a part of two tracks is computed.

Next, there will be described an example in which the recorded information of the track number 1 that is the closest to a leading edge portion (having a clock number of 558515) of the 3T bit to be recorded on the track number 2 described above. First of all, it is apparent from FIG. 5B that angular information Ø (558515) corresponding to a clock number 558515 is 6.283298. Subsequently, a value of $2\pi$ is subtracted from 6.283298. Consequently, 0.000112 is obtained. In FIG. 5A, it is apparent that a clock number 10 is equivalent to a value which is the closest to 0.000112. Accordingly, it is understood that the pattern of the track number 1 to be recorded adjacently to the leading edge portion of the 3T bit to be recorded as a clock number 558515 in the track number 2 is a 5T bit from a clock number 7 to a clock number 11.

All the above-mentioned processings are realized as a software to be executed by the computer 43 shown in FIG. 2. All the values Ø(n) and the like are recorded in the hard disk 42. The algorithm of the software will be described with reference to FIG. 6.

At a step SP1 shown in FIG. 6, the recording modulating signal SC is fetched into the hard disk 42 for each channel clock CK by way of the input interface circuit 41. The computer 43 refers to the value of the recording modulating signal SC thus fetched as an array SC (n). At a step SP2, rotation angle information is computed for each channel clock from the SC (n), information on a radius for recording start and information on a recording density, and is stored as an array Ø(n). At a step SP3, then, SC (n) and Ø(n) thus obtained are used to compute a cross talk compensation amount SX (n) for correcting the recording signal. At a step SP4, finally, a rotation reference signal SF for controlling the spindle servo circuit 4 is computed for each channel clock from the rotation angle information SC (n) and is stored as an array SF (n).

Figure 7:
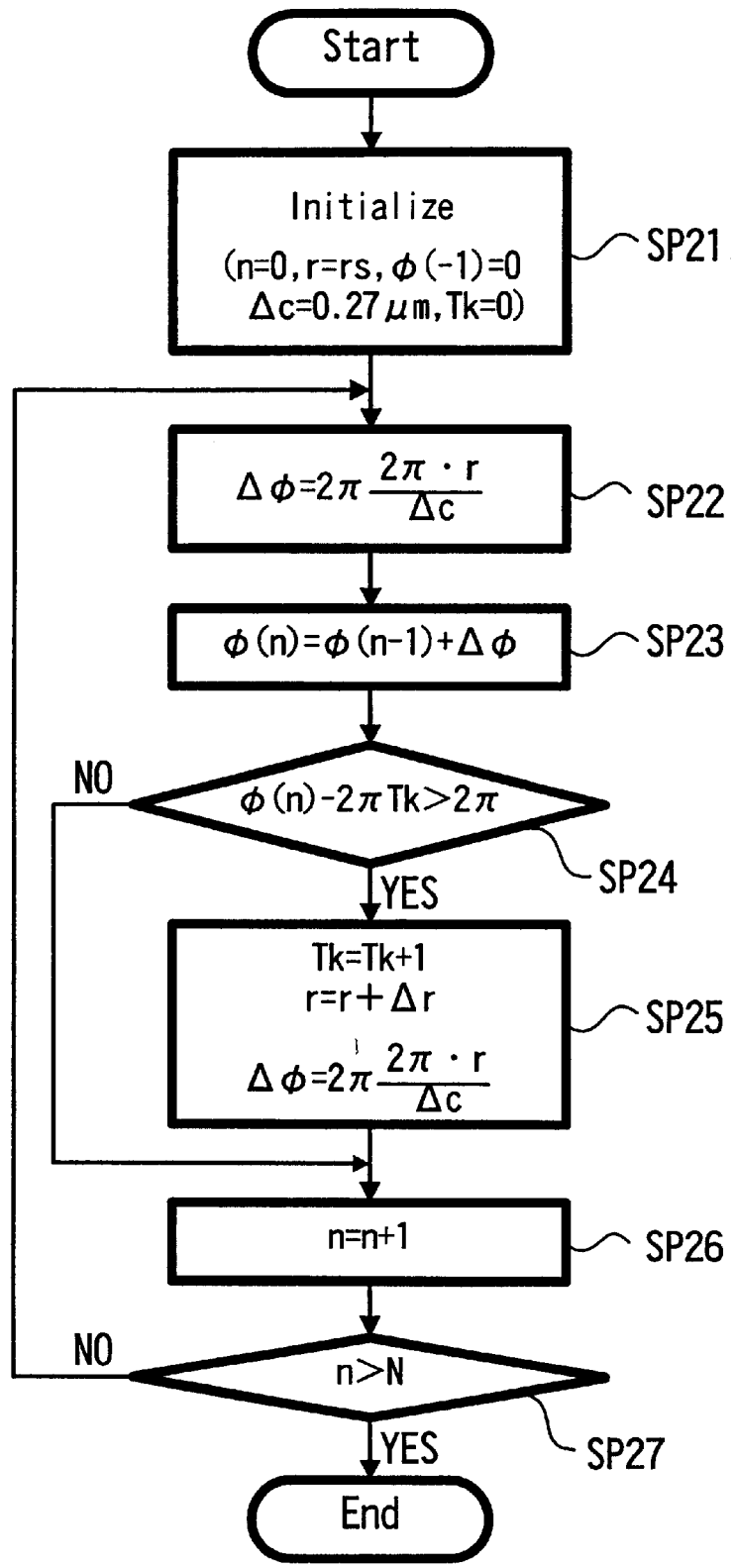
FIG. 7 is a flowchart showing the processing procedure of a step SP2 according to the present invention.

A processing for computing the rotation angle information which is to be performed at the step SP2 is performed at steps SP21 to SP26 shown in FIG. 7. First of all, each of variables and parameters to be used for the computation is initialized at the step SP 21. A variable n is a pointer indicative of a channel clock number during the processing, and 0 is input as an initial value. A radius rs for the recording start is substituted for a variable r representing a radius during the processing (in the above-mentioned example, rs=24 mm). As the initial value of the array Ø(n) representing the rotation angle, a value of 0 is substituted for Ø(-1). Similarly, 0 is substituted for a track information variable Tk representing the total of tracks which have completely been processed. The length of one channel clock is computed from a linear density to be recorded and is substituted for Δc. For example, Δc has a value of about 0.27 microns in the CD.

At the step SP22, an increment value ΔØ of the rotation angle is computed from the above-mentioned values as expressed by Equation 1.

$$\Delta\varnothing = 2\pi(2\pi r \pm \Delta c) \quad (1)$$

At the step SP23, the rotation angle information Ø(n) in an nth channel clock is computed as expressed by Equation 2 and is stored as an array.

$$\varnothing(n) = \varnothing(n-1) + \Delta\varnothing \quad (2)$$

At the step SP24, it is decided whether or not a phase change of one rotation or more is detected from the rotation angle information Ø(n) computed as described above. The decision is carried out depending on whether Ø(n) satisfies Equation 3 or not.

$$\varnothing(n) = 2\pi Tk > 2\pi \quad (3)$$

If it is decided that Ø(n) does not satisfy the Equation 3, the processing skips to the step SP26. If it is decided that Ø(n) satisfies the Equation 3, the routine proceeds to the step SP25 where the track information variable Tk, the variable r representing the radius and the variable ΔØ representing the increment value of the rotation angle are updated as expressed by Equations 4, 5 and 6:

$$Tk=Tk+1 \quad (4)$$

$$r=r+\Delta r \quad (5)$$

$$\Delta\emptyset=2\pi(2\pi r \div \Delta c) \quad (6)$$

wherein Δr represents a track pitch which has a value of 1.6 microns in the CD.

At the step SP26, a pointer n is updated by 1 and a preparation is carried out to process the next channel clock. At the step SP27, finally, the pointer n is compared with a value N indicative of the end of data. If the processing has not been completed for all the data, the result of the comparison at the step SP27 is "No" and the processing is executed again from the step SP23. On the other hand, if it is decided that the processing has been completed for all the data, the processing in this portion is ended.

Next, description will be given to a processing for computing the compensation value of the algorithm SP3 to obtain the cross talk compensation value SX(n) with reference to FIG. 8. As embodiments for this part, various implementation examples can be proposed. For example, the patent application which has been made by the same inventor and has already been filed from the same applicant as in the present invention, that is, Japanese Unexamined Patent Publication No. Hei 09-275972 has disclosed a method for obtaining a cross talk compensation value according to patterns recorded on adjacent tracks. Also in the embodiment of the present invention, it is as a matter of course that the cross talk can be compensated almost completely by fine adjustment of a compensation value according to signal patterns recorded on the adjacent tracks with the use of the same method. However, only a simpler implementation example is shown in the embodiment of the present invention.

Figure 8:
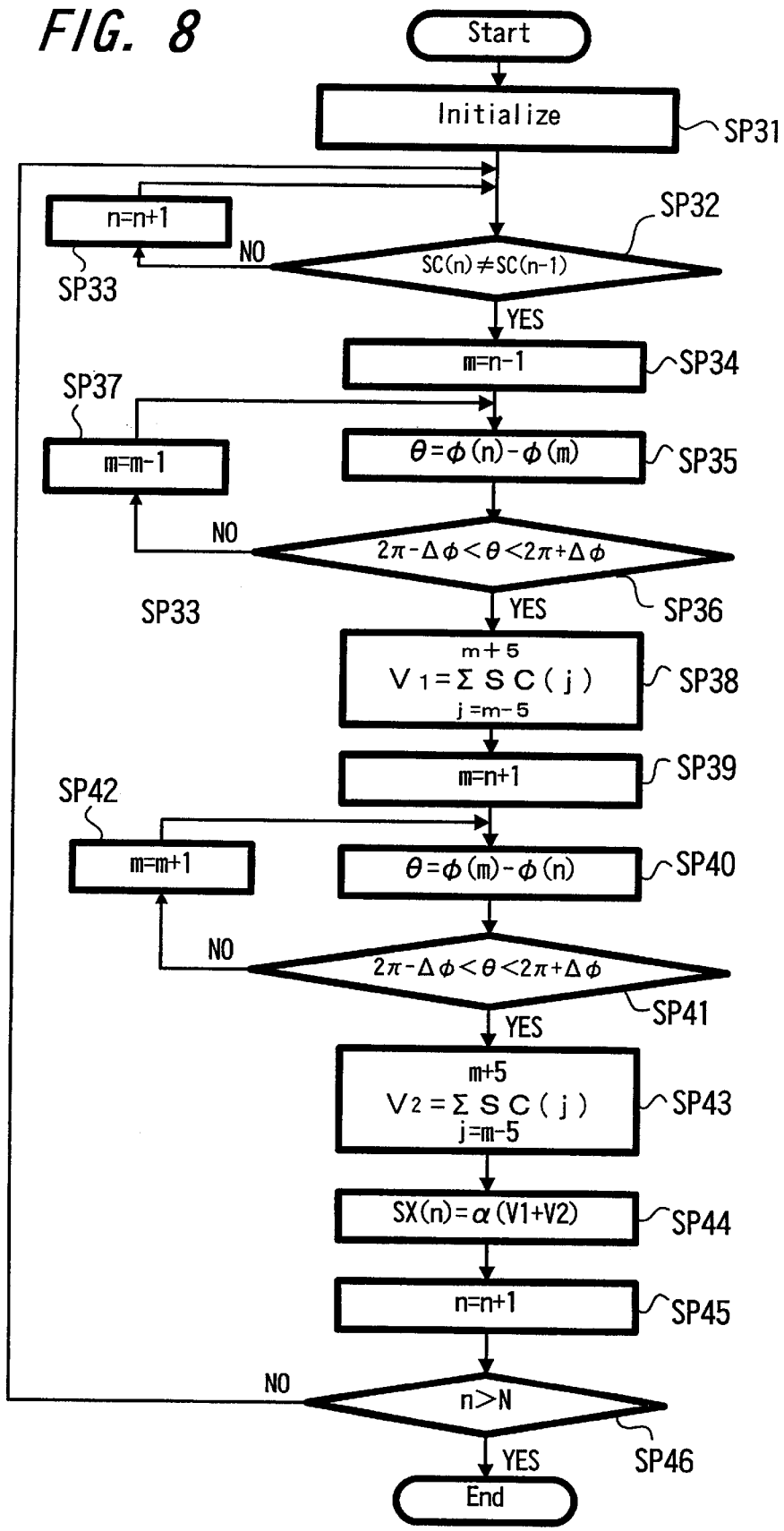
FIG. 8 is a flowchart showing the processing procedure of a step SP3 according to the present invention.

In the algorithm to obtain the cross talk compensation value SX(n) shown in FIG. 8, first of all, each variable is initialized at a step SP31. For example, the pointer n indicative of the channel clock number during a processing is set to a value indicative of data in the start portion of the track number 2 (n=55805 in the example shown in FIG. 5) as an initial value.

At a step SP32, the edge of the recording modulating signal SC(n) is detected. More specifically, if the SC(n) is a leading or trailing portion, the SC(n) is not equal to SC(n−1). Therefore, the edge portion can be detected as the changing point of the recording modulating signal SC. If there is no edge portion, the algorithm proceeds to a step SP33 where 1 is added to the pointer n to set the processing of the next data. Then, the algorithm returns to the step SP32.

From step SP34 to step SP38, a cross talk sent from the track adjacent to the inside of the optical disk is obtained for the data indicated by the pointer n. At the step SP34, first of all, a value of (n−1) is input as the value of a pointer m on the adjacent track. At the step SP35, then, a difference between a rotation angle Ø(n) obtained from the pointer n and a rotation angle Ø(m) obtained from the adjacent track pointer m is obtained and input to a variable θ. At the step SP36, next, it is decided whether or not the variable θ has a value fully close to 2π(if the difference between the rotation angles is smaller than the above-mentioned ΔØ, the variable is fully small.) As a result, if the value of the variable θ is not almost 2π, 1 is subtracted from the value of the pointer m on the adjacent track at the step SP37. Consequently, the comparison with the rotation angle Ø(m) obtained from data positioned apart by 1 clock is further repeated at the step SP35.

If the value of the variable θ is fully close to 2π, it is supposed that the pointer m of the adjacent track indicates data on the inside of the pointer n by just one track. Then, the step SP38 is executed so that a cross talk amount V1 sent from the track provided on the inside by 1 track is estimated. As the embodiment, description will be given, as the simplest example, to the case where the cross talk amount V1 is simply proportional to the length of the bit put on the adjacent track. More specifically, the sum of data of "1" to be recorded from (m−5)th to (m+5)th channel clocks is obtained and is substituted for the variable V1. Thus, the cross talk amount V1 is obtained.

At steps SP39 to SP43, subsequently, a cross talk sent from the track adjacent to the outside of the optical disk is obtained for the data indicated by the pointer n. At the step SP39, first of all, a value of (n+1) is input as the value of the pointer m on the adjacent track. At the step SP40, then, a difference between a rotation angle Ø(n) obtained from the pointer n and a rotation angle Ø(m) obtained from the pointer m on the adjacent track is obtained and input to a variable θ. At the step SP41, next, it is decided whether or not the variable θ has a value fully close to 2π(if the difference between the rotation angles is smaller than the above-mentioned ΔØ, the variable θ is fully small.) As a result, if the value of the variable θ is not almost 2π, 1 is added to the value of the pointer m on the adjacent track at the step SP42. Consequently, the comparison with the rotation angle Ø(m) obtained from data in a place positioned apart by 1 clock is further repeated at the step SP42.

If the value of the variable θ is fully close to 2π, it is supposed that the pointer m on the adjacent track indicates data on the outside of the pointer n by just one track. Then, the step SP43 is executed so that a cross talk amount V2 sent from the track provided on the outside by 1 track is estimated. For the embodiment, description will be given, as the simplest example, to the case where the cross talk amount V2 is simply proportional to the length of the bit put on the adjacent track. More specifically, the sum of data of "1" to be recorded from (m−5)th to (m+5)th channel clocks is obtained and is substituted for the variable V2. Thus, cross talk amount V2 is obtained.

At a step SP44, subsequently, a cross talk compensation value SX(n) for compensating for a cross talk is obtained from the estimation amounts V1 and V2 of the cross talk obtained as described above. In an example, the sum of V1 and V2 is multiplied by a constant α most easily so that a cross talk compensation amount for a signal of an nth channel clock is obtained. The value of constant a may be an optimal value obtained by an operation such as a computer simulation and so on or can be obtained from a trial disk by the following method or the like. More specifically, some proper values are determined. The respective values are used as α to obtain a cross talk compensation value SX (n). Their results are used to perform cutting, thereby creating a disk. A jitter is measured from all the disks thus created. α capable of obtaining the smallest jitter is employed. Thus, the value of the constant a can be determined by the disk.

Finally, it is decided whether or not the pointer n is executed for all necessary data at a step SP46. If there is residual data, (n>N is not established), the routine returns to the step SP32 and the processing is repeated. If it is decided that the processing has been completed for all the data, the processing for this portion is ended.

Figure 9:
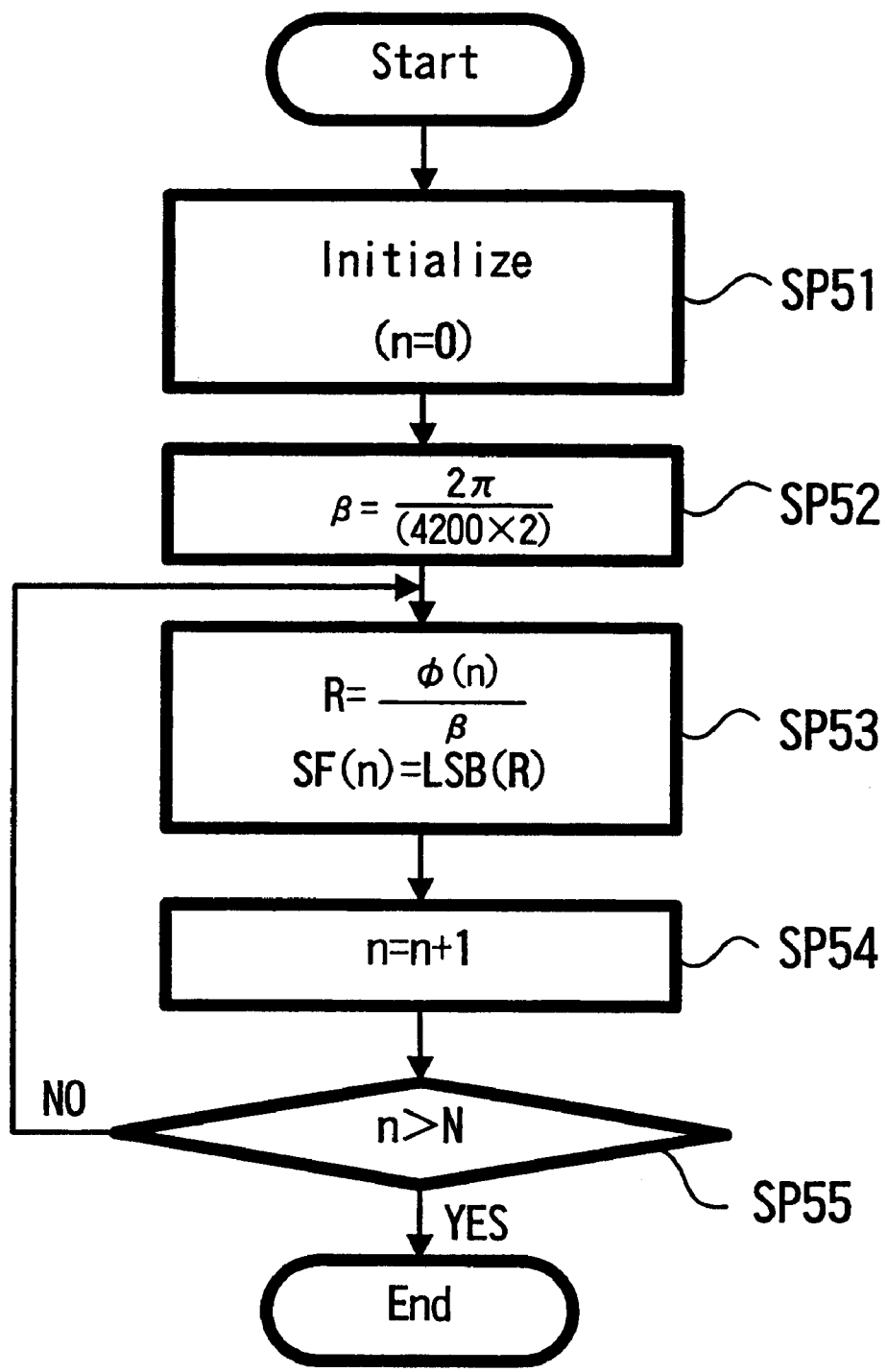
FIG. 9 is a flowchart showing the processing procedure of a step SP4 according to the present invention.

With reference to FIG. 6, description will be given to the detailed processing procedure of the step SP4 indicated as an FG signal computing step according to a flowchart shown in FIG. 9. In an algorithm for obtaining a rotation reference signal SF(n) shown in FIG. 9, each variable is first initialized at a step SP51. For example, a pointer n indicative of a channel clock number during a processing is set to a value indicative of data for the start portion of the track number 1 as an initial value (for example, n=0).

Next, a constant β is computed as expressed by Equation 7 at a step SP52.

$$\beta = 2\pi \div (4200 \times 2) \quad (7)$$

Subsequently, an integer variable R is computed as expressed by Equation 8 at a step SP53.

$$R = \emptyset(n) \div \beta \quad (8)$$

Furthermore, the least significant bit of the integer variable R thus obtained is substituted for SF(n).

Then, 1 is added to the pointer n at a step SP54 and a preparation is performed to execute a processing for the next data. Finally, it is decided whether or not the pointer n is executed for all necessary data at a step SP55. If there is residual data, (n>N is not established), the routine returns to the step SP53 and the processing is repeated. If it is decided that the processing has been completed for all the data, the processing for this portion is ended.

The SF(n) determined as described above acts as a signal which repeats a change between 0 and 1 4200 times while the rotation angle Ø(n) used for the computation is changed by 2π. Such a signal is sequentially read from the cross talk compensation value computing circuit 7, and is supplied to the spindle servo circuit 4. The spindle servo circuit 4 detects phase errors between the signal SF(n) thus obtained and the FG signal supplied from the FG signal generating circuit fixed to the bottom of the spindle motor 3, and performs control in such a manner that the detected phase errors are coincident with each other. For such a circuit, a PLL circuit is used.

The FG signal is formed to generate 4200 pulses when the spindle motor 3 rotates one turn. This signal and the signal SF(n) having the π interval of the rotation angle Ø(n) divided into 4200 equal parts have the same frequency and phase. Consequently, the rotation angle Ø(n)is precisely coincident with the rotation angle of the spindle motor 3. Thus, the information on the rotation angle which is used for the computation by the computer 43 is coincident with the rotation angle of the motor during recording. Therefore, the estimation amount of the cross talk which is obtained by the computation accurately reflects the recording signal to be sent to the disk.

Figure 10:
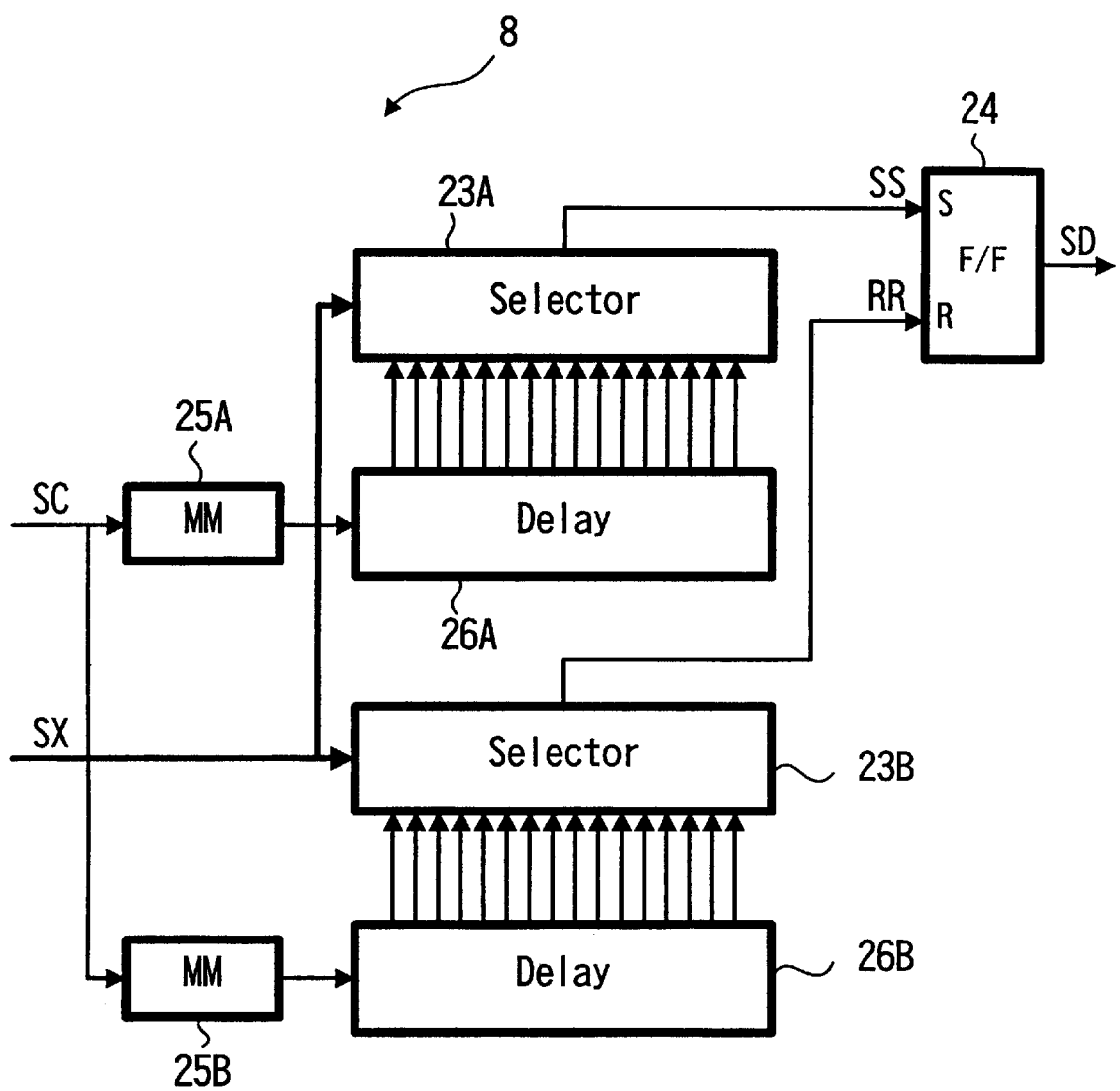
FIG. 10 is a block diagram showing the structure of a timing correcting circuit according to the present invention.

FIG. 10 shows the structure of the timing correcting circuit 8. In FIG. 10, the modulating signal SC is supplied to monostable multivibrators 25A and 25B. The monostable multivibrator 25A outputs a pulse signal whose level rises by using the leading edge of the modulating signal SC as a reference for a predetermined period (a much shorter period than the period 3T if EFM modulation is used for a modulation technique). The monostable multivibrator 25B outputs a pulse signal whose level rises by using the trailing edge of the modulating signal SC as a reference for a predetermined period (a much shorter period than the period 3T).

These pulse signals are sent to delay circuits 26A and 26B, respectively. The delay circuits 26A and 26B have a 15-step tap output. A difference in a delay time between adjacent taps is set to a resolution for timing correction of the modulating signal in the timing correcting circuit 8. The delay circuit 26A sequentially delays the pulse signal generated from the leading edge of the modulating signal SC which is to be output from the monostable multivibrator 25A, and outputs the same signal from each tap. A selector 23A selects and outputs the tap output of the delay circuit 26A in response to the cross talk correction signal SX, thereby selecting and outputting a pulse signal SS whose a delay time is changed in response to the cross talk correction signal Sx. Similarly, the delay circuit 26B sequentially delays a pulse signal generated from the tailing edge of the modulating signal SC which is to be output from the monostable multivibrator 25B, and outputs the same signal from each tap. A selector 23B selects and outputs the tap output of the delay circuit 26B in response to the cross talk correction signal SX, thereby selecting and outputting a pulse signal RR whose a delay time is changed in response to the cross talk correction signal SX.

A flip-flop (F/F) 24 synthesizes the pulse SS formed from the leading edge with the pulse RR formed from the trailing edge, and outputs the synthesized pulse. More specifically, the flip-flop 24 inputs the pulses SS and RR to a set terminal S and a reset terminal R, respectively. Consequently, a modulating signal SD is generated. The signal level of the modulating signal SD rises with a rise in the pulse SS generated from the rising edge and falls with a rise in the pulse RR generated from the trailing edge.

The modulating signal SD thus generated is supplied to the optical modulator 10 to modulate the laser light L sent from the laser 9, thereby exposing the disk original 2 to light. Consequently, a cross talk sent from adjacent tracks is predicted. The edge position of a bit is shifted to a proper position according to the predicted cross talk. If such a bit is reproduced, a good signal having a cross talk removed can be obtained from the disk.

FIG. 11 typically shows an optical disk recording medium in which recording has been performed by using the optical disk recording apparatus 1. In FIG. 11, four bits of A, B, C and D are recorded in a central portion. Each of these bits represents 3T information. In an ordinary optical disk recording medium, these four bits are recorded to have the same length. However, the bit on the optical disk recording medium which is recorded in the optical disk recording apparatus according to the present invention is slightly varied in length by a bit pattern recorded on the adjacent track even if the bit represents the 3T information.

For example, neither of two tracks adjacent to the bit A records a bit. Therefore, the bit A is recorded to have a standard length. However, the positions of the leading and trailing edges of each of the bits B and C are slightly shifted and recorded in order to eliminate the influence of a great bit recorded in the adjacent track on one of sides. As a result, the bits B and C are recorded to have slightly small lengths. Furthermore, the positions of the leading and trailing edges of the bit D are shifted further greatly in order to cancel a cross talk sent from the adjacent tracks because bits are recorded in the same adjacent tracks on both sides. As a result, the bit D is recorded to have the smallest length out of the bits (A to D) shown in FIG. 11.

A reproduced spot scans the optical disk recording medium thus fabricated, thereby getting a reproduced signal. Consequently, a reproduced signal having an ideal length of 3T is obtained from each of the bits A, B, C and D. Thus, it is possible to obtain excellent reproduction characteristics without a jitter caused.

While the positions of the rising and trailing edges have been shifted according to the predicted cross talk to perform correction for the cross talk in the above-mentioned embodiment, the present invention is not restricted thereto but the output of the laser which is to be recorded can also be corrected according to the amount of the predicted cross talk, for example.

With such a structure as to correct the laser output, the bit width is recorded differently depending on the laser output. For example, description will be given to a bit to be formed by correcting the laser output in the example of FIG. 11. Since neither of two tracks adjacent to the bit A records bits, the bit A is recorded to have a standard width. Referring to the bits B and C, however, a great bit is recorded in the adjacent track on one of sides. Therefore, the laser output is lowered and recorded to remove the influence of the great bit. As a result, the bits B and C have bit widths slightly reduced. Referring to the bit D, furthermore, a bit is recorded in the adjacent tracks on both sides. Therefore, the laser output is lowered further greatly in order to cancel a cross talk sent from the adjacent tracks. As a result, the bit D is recorded to have the smallest width out of the bits (A to D) shown in FIG. 11.

Also in the case where the laser output is thus changed to perform correction, a reproduced signal having an ideal length of 3T is obtained from each of the bits A, B, C and D if the reproduced spot scans the optical disk recording medium thus fabricated to get a reproduced signal. Consequently, it is possible to obtain excellent reproduction characteristics without a jitter caused.

While only the case where the cross talk is simply corrected has been described in the above-mentioned embodiment, an optical disk for evaluation may be created several times to modify a correction value by the optical disk for evaluation. If the correction value is repeatedly modified, a jitter can be surely reduced correspondingly.

Although only the case where the cross talk sent from the adjacent tracks is corrected has been described in the above-mentioned embodiment, the present invention is not restricted thereto but it is a matter of course that a pattern to be recorded before and after the bit which is being recorded may be inspected to remove both an inter-symbol interference sent from the bits before and after the bit which is being recorded and a cross talk sent from the adjacent tracks. In this case, the jitter caused by the inter-symbol interference recorded before and after is also decreased. Thus, it is possible to manufacture a disk having a further preferable jitter.

The optical information recording apparatus according to the present invention serves to generate a modulating signal based on data and to then predict a bit string on a disk which is to be generated when the modulating signal is recorded on an optical disk. At this time, in the optical information recording apparatus according to the present invention, the position of the bit string is predicted in relation to the rotation angle in the optical disk. Furthermore, the optical information recording apparatus comprises the adjacent track information computing means for computing the information on the adjacent track in response to the information on the rotation angle thus obtained and the modulating signal, the correction value computing means for obtaining a correction value based on the output of the adjacent track information computing means and the signal correcting means for correcting the modulating signal based on the correction value. Moreover, the optical information recording apparatus comprises rotation control means for controlling the rotating means according to the angle information. Therefore, also in a recording mode in which the rotational speed is variable such as a CVL, it is possible to create a disk which compensates for a cross talk with a simple structure.

Consequently, the disk created by the optical information recording apparatus according to the present invention can reduce an overall jitter even in the CLV mode and can perform stable reproduction even if a noise level is more or less raised at a high transfer rate.

Furthermore, the present invention provides an optical information recording method comprising a modulating signal creating step for creating a modulating signal in accordance with the digital data, an angle information computing step for computing angle information of the laser light on the medium when the laser light modulated by the modulating signal is radiated on the medium, a correction information computing step for obtaining correction information for correcting the modulating signal in response to the modulating signal and the angle information, a rotation control step for controlling a rotation of the rotating device in accordance with the angle information, and a signal correcting step for correcting the modulating signal in accordance with the correction information to obtain a corrected modulating signal.

In the optical information recording method according to the present invention, the modulating signal is finely adjusted in accordance with a cross talk predicted from the information recorded on adjacent tracks. Consequently, it is possible to remove a jitter generated by the cross talk sent from the adjacent tracks during reproduction. Consequently, a disk having a low jitter can be created. As a result, the disk created by the optical information recording method of the present invention can reduce an overall jitter even in the CLV mode, and can perform stable reproduction even if a noise level is more or less raised at a high trans ferrate.

Moreover, the present invention provides an optical information medium in which the positions of edges before and after the bit are adjusted according to bit patterns recorded on a plurality of tracks adjacent to the bit on the disk recorded in the CLV mode. Therefore, in the case where such a medium is reproduced by an ordinary optical disk device, an overall jitter is reduced and stable reproduction can be performed even if a noise level is more or less raised at a high transfer rate. The function of adjusting the positions of the edges before and after the bit can be implemented by an element referred to as a programmable delay line and put on the market or the like in the recording apparatus. Consequently, an inexpensive recording medium can be implemented.

Furthermore, the present invention provides an optical information medium in which a bit width is adjusted depending on patterns recorded on a plurality of tracks adjacent to the bit on a disk recorded in the CLV mode. Therefore, in the case on a disk recorded in the CLV mode. Therefore, in the case where such a medium is reproduced by an ordinary optical disk device, an overall jitter is reduced and stable reproduction can be performed even if a noise level is more or less raised at a high transfer rate. The function of adjusting the bit width can easily be implemented in the recording apparatus. Consequently, an inexpensive recording medium can be implemented.

While there has been described what are at present considered to be a preferred embodiment of the invention, it will be understood that various modifications may be made thereto, and it is intended that the appended claims cover all such modifications as fall within the true spirit and scope of the invention.

What is claimed is:

1. An optical information recording apparatus in which a laser light is modulated to form a bit string as a spiral track on an optical information medium attached to a rotating means, thereby recording digital information, comprising:

a modulating signal creating means for creating a modulating signal in accordance with the digital information;

an angle information computing means for obtaining angle information when the modulating signal is recorded on a disk;

a correction value computing means for computing a correction value in response to the angle information and the modulating signal;

a signal correcting means for correcting the modulating signal based on the correction value; and a rotation control means for controlling the rotating means in accordance with the angle information, wherein the laser light is modulated in response to an output of the correction value computing means, thereby performing recording on the optical information medium.

2. The optical information recording apparatus according to claim 1, wherein the signal correcting means serves to correct rising and falling timings of the modulating signal.

3. The optical information recording apparatus according to claim 1, wherein the signal correcting means serves to correct an amplitude of the modulating signal, thereby correcting an output of the laser light.

4. The optical information recording apparatus according to claim 1, wherein the correction value computing means has a correction data storing means and corrects a timing of the modulating signal in accordance with correction data stored in the correction data storing means.

5. The optical information recording apparatus according to claim 4, wherein the correction data is set based on a result of reproduction of an optical information medium for evaluation.

6. The optical information recording apparatus according to claim 1, wherein the rotation control means comprises a phase error detecting means for computing a phase error between the angle information and rotation angle information of the rotating means, and a control means for changing the number of rotations of the rotating means in response to an output of the phase error detecting means.

7. The optical information recording apparatus according to claim 6, wherein the rotation control means controls a rotation velocity of the optical information medium in such a manner that a relative velocity of the optical information medium and the laser light have almost a constant value irrespective of a radius during recording.

8. An optical information recording method for radiating a laser light on an optical information medium attached to a rotating device to sequentially form a bit as a spiral track and to record digital data by the bit, comprising:

a modulating signal creating step for creating a modulating signal in accordance with the digital data;

an angle information computing step for computing a predicted angle of the laser light on the medium when the laser light modulated by the modulating signal is radiated on the medium;

a correction information computing step for obtaining correction information for correcting the modulating signal in response to the modulating signal and the predicted angle;

a rotation control step for controlling a rotation of the rotating device in accordance with the predicted angle;

a signal correcting step for correcting the modulating signal in accordance with the correction information to obtain a corrected modulating signal; and a step for modulating the laser in response to the corrected modulating signal to perform recording on the optical information medium.

9. The optical information recording method according to claim 8, wherein the signal correcting step comprises an edge shifting step for shifting positions of leading and trailing edges of the modulating signal.

10. The optical information recording method according to claim 8, wherein the signal correcting step comprises an amplitude correcting step for correcting an amplitude of the modulating signal and a laser output correcting step of correcting an output of the laser light in accordance with the amplitude of the modulating signal.

11. The optical information recording method according to claim 8, wherein the rotating device comprises an angle detecting step of outputting a medium rotation angle signal in response to a rotation angle of the optical information medium, and the rotation control step includes a comparing step for comparing the medium rotation angle signal with the predicted angle.

12. An optical information medium in which information is recorded by a bit string in such a manner that a recording density of main information is almost cons tant irrespective of a radius, wherein positions of edges before and after a bit are adjusted in accordance with bit patterns recorded on a plurality of tracks adjacent to the bit.

13. An optical information medium in which information is recorded by a bit string in such a manner that a recording density of main information is almost constant irrespective of a radius, wherein a bit width is adjusted in accordance with patterns recorded on a plurality of tracks adjacent to the bit.

* * * * *

UNITED STATES PATENT AND TRADEMARK OFFICE
CERTIFICATE OF CORRECTION

PATENT NO. : 6,307,823 B1
DATED : October 23, 2001
INVENTOR(S) : Seiji Kobayashi It is certified that error appears in the above-identified patent and that said Letters Patent is hereby corrected as shown below:

Column 2,
Line 50, after "hereinafter" insert -- be --.

Column 3,
Line 28, after "or" insert -- less. --.

Column 6,
Line 27, change "crows" to -- cross --.

Column 10,
Line 3, change "obtain ed" to -- obtained --; and
Lines 52 and 61, change "a" to -- $\alpha$ --.

Column 12,
Line 10, change "$S_x$" to -- SX --.

Column 14,
Line 25, change "t racks" to -- tracks --; and
Line 30, change "trans ferrate" to -- transfer rate --.

Column 16,
Line 39, change "cons tant" to -- constant --.

Signed and Sealed this

Thirtieth Day of April, 2002

*Attest:*

*Attesting Officer*

JAMES E. ROGAN
*Director of the United States Patent and Trademark Office*